US012639418B2

(12) United States Patent
Miao et al.

(10) Patent No.: US 12,639,418 B2
(45) Date of Patent: May 26, 2026

(54) COMPUTER SYSTEM, SERVICE PROCESSING METHOD, READABLE STORAGE MEDIUM, AND CHIP

(71) Applicant: HUAWEI TECHNOLOGIES CO., LTD., Shenzhen (CN)

(72) Inventors: Xin Miao, Hangzhou (CN); Kexiong Yu, Shenzhen (CN)

(73) Assignee: Huawei Technologies Co., LTD.

( * ) Notice: Subject to any disclaimer, the term of this patent is extended or adjusted under 35 U.S.C. 154(b) by 578 days.

(21) Appl. No.: 17/981,050

(22) Filed: Nov. 4, 2022

(65) Prior Publication Data

US 2023/0062300 A1      Mar. 2, 2023

Related U.S. Application Data

(63) Continuation of application No. PCT/CN2021/085805, filed on Apr. 7, 2021.

(30) Foreign Application Priority Data

May 8, 2020     (CN) .......................... 202010390095.8

(51) Int. Cl.
G06F 21/53          (2013.01)

(52) U.S. Cl.
CPC ........ G06F 21/53 (2013.01); *G06F 2221/034* (2013.01)

(58) Field of Classification Search
CPC .... G06F 21/53; G06F 2221/034; G06F 21/74; G06F 21/57
See application file for complete search history.

(56) References Cited

U.S. PATENT DOCUMENTS

| | | | |
|---|---|---|---|
| 8,943,251 B2 * | 1/2015 | Schoenfeldt | G06F 13/24 |
| | | | 710/316 |
| 9,830,480 B2 * | 11/2017 | Poiesz | G06F 21/53 |
| 2005/0052280 A1 | 3/2005 | Fukushima et al. | |

FOREIGN PATENT DOCUMENTS

| | | |
|---|---|---|
| CN | 104992122 A | 10/2015 |
| CN | 106295259 B | 2/2019 |

(Continued)

OTHER PUBLICATIONS

Extended European Search Report in European Appln No. 21799939.0, dated Aug. 3, 2023, 19 pages.

*Primary Examiner* — Farid Homayounmehr
*Assistant Examiner* — Suman Debnath
(74) *Attorney, Agent, or Firm* — Fish & Richardson P.C.

(57)          ABSTRACT

Computer systems, service processing methods, and chips are provided in this disclosure. In one implementation, a computer system comprises an interrupt status register, a permission management register, a processor, a target storage space, and a memory storing programming instructions for execution by the processor to: set a flag corresponding to the first interrupt in the interrupt status register to a first interrupt flag and a flag corresponding to the first interrupt in the permission management register to a first call flag, wherein the first interrupt flag and the first call flag indicate whether access to the target storage space is allowed, determine whether to allow the processor to access the target storage space, and obtain first information in the target storage space in a TEE mode if determining that the processor is allowed to access the target storage space; and execute the target service based on the first information.

21 Claims, 12 Drawing Sheets

(56) References Cited

FOREIGN PATENT DOCUMENTS

| CN | 110069332 | A | 7/2019 |
| WO | 2017063529 | A1 | 4/2017 |

* cited by examiner

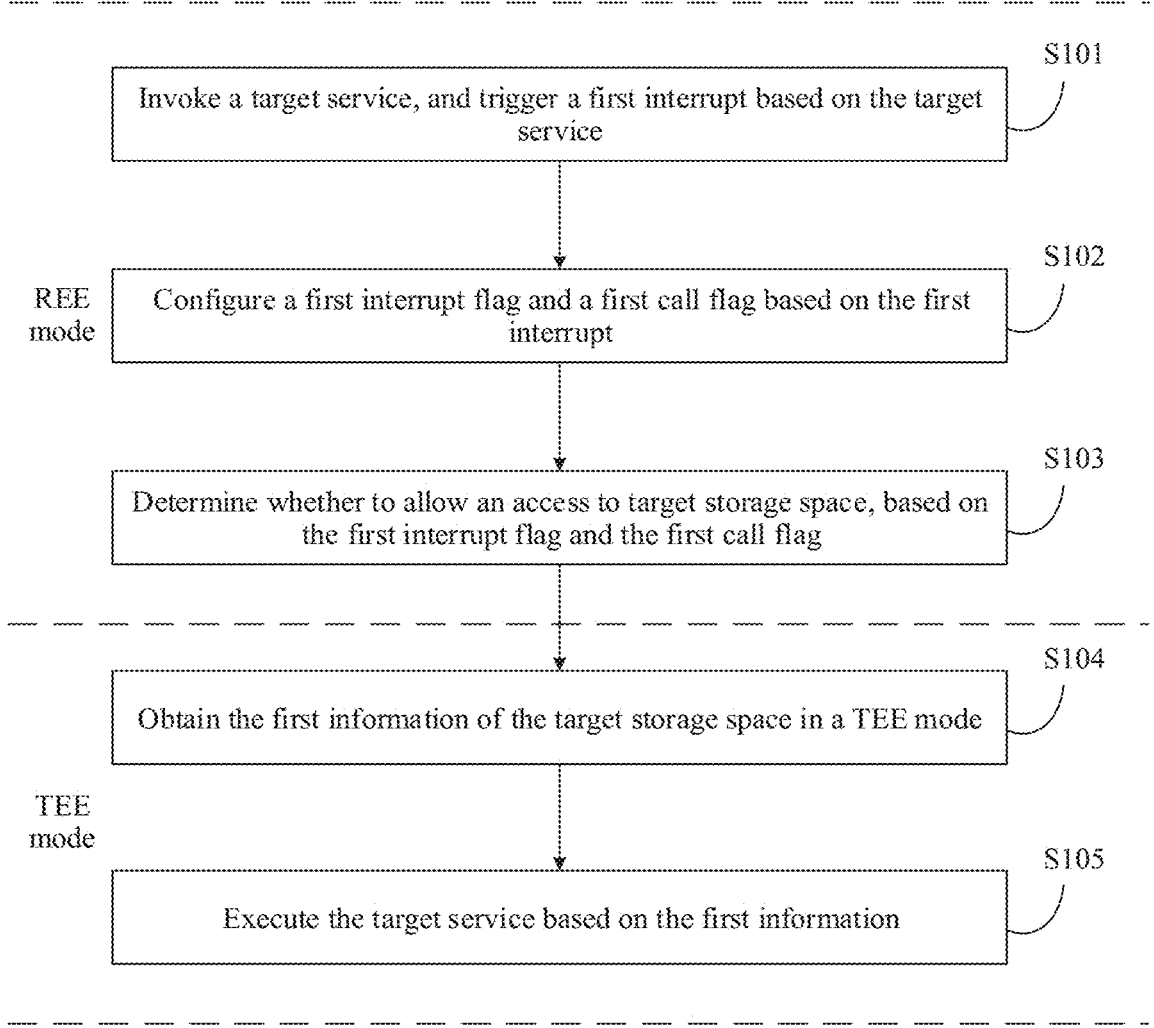

REE mode

S101
Invoke a target service, and trigger a first interrupt based on the target service S102
Configure a first interrupt flag and a first call flag based on the first interrupt S103
Determine whether to allow an access to target storage space, based on the first interrupt flag and the first call flag TEE mode S104
Obtain the first information of the target storage space in a TEE mode S105
Execute the target service based on the first information

FIG. 3

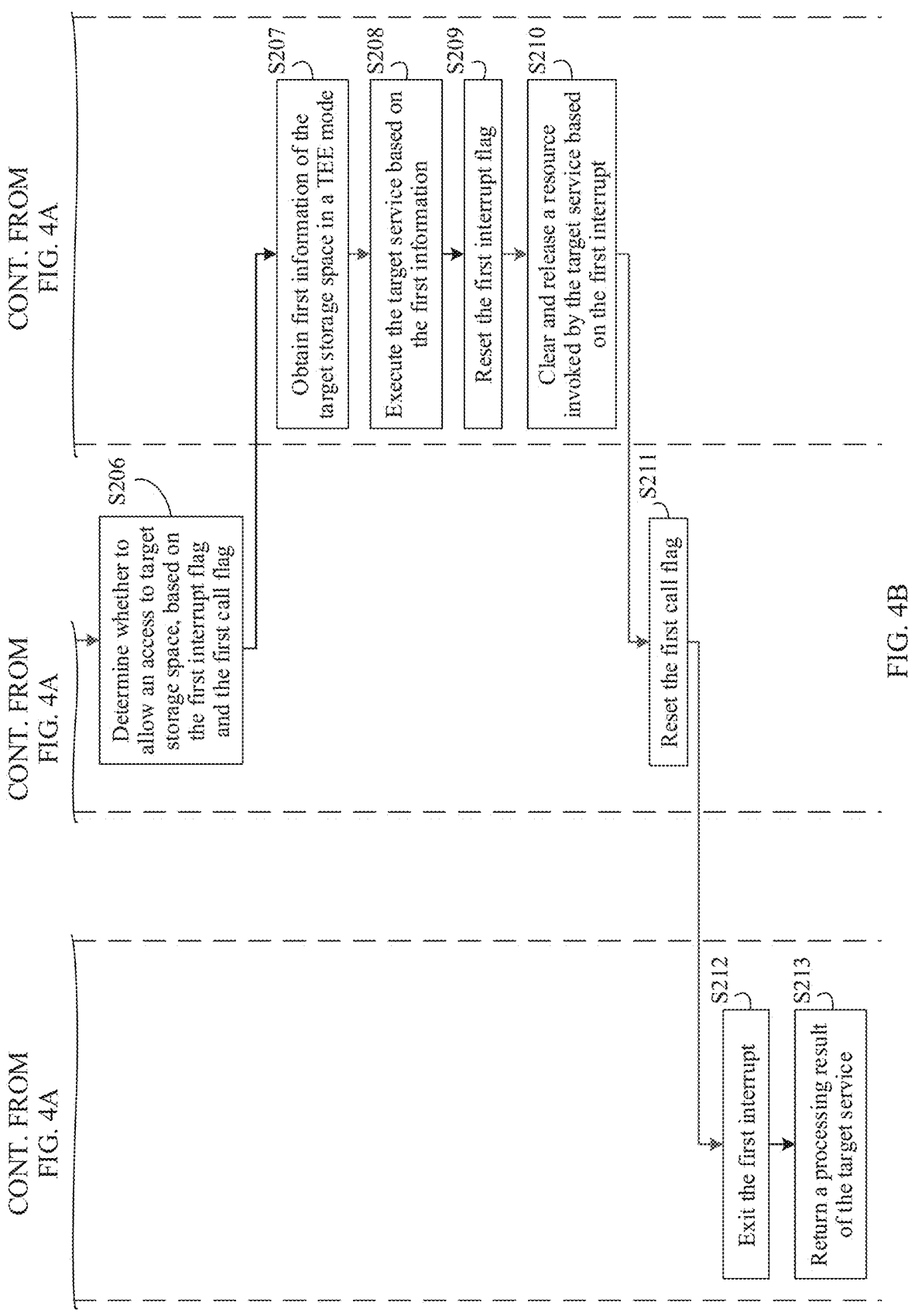

CONT. FROM FIG. 4A

CONT. FROM FIG. 4A

CONT. FROM FIG. 4A

S206
Determine whether to allow an access to target storage space, based on the first interrupt flag and the first call flag S207
Obtain first information of the target storage space in a TEE mode S208
Execute the target service based on the first information S209
Reset the first interrupt flag S210
Clear and release a resource invoked by the target service based on the first interrupt S211
Reset the first call flag S212
Exit the first interrupt S213
Return a processing result of the target service

FIG. 4B

COMPUTER SYSTEM, SERVICE PROCESSING METHOD, READABLE STORAGE MEDIUM, AND CHIP

CROSS-REFERENCE TO RELATED APPLICATIONS

This application is a continuation of International Application No. PCT/CN2021/085805, filed on Apr. 7, 2021, which claims priority to Chinese Patent Application No. 202010390095.8, filed on May 8, 2020. The disclosures of the aforementioned applications are hereby incorporated by reference in their entireties.

TECHNICAL FIELD

Embodiments of this application relate to the field of computer technologies, and in particular, to a computer system, a service processing method, a readable storage medium, and a chip.

BACKGROUND

Internet of things (the internet of things, IoT) is a network of mutually-connected physical things, as well as a network extended and expanded based on the Internet. It combines various information sensing devices with the Internet to form a huge network, so as to implement interconnections between people, machines, and things anytime and anywhere. With continuous development of communication technologies, the internet of things has been rapidly and widely applied to various industries, such as smart city and agriculture. However, the interconnections between things cause a series of security problems while creating an active environment.

To address the device security problems, a concept of trusted execution environment (trusted execution environment, TEE) is proposed. Specifically, the TEE is a running environment coexisting with the intrusted execution environment, for example, a rich execution environment (rich execution environment, TEE), on the device. Usually, two operating systems respectively run in the TEE and the REE, and different applications may run on the two operating systems. Applications of the TEE can provide a security service for applications of the REE. For example, a mobile payment service, sensitive data protection, and security authentication may be performed in the TEE. However, current implementation of TEE needs to introduce excessively high cost chips, and cannot meet requirements for low costs and high performance.

SUMMARY

Embodiments of this application provide a computer system, a service processing method, a readable storage medium, and a chip, to implement a high security trusted execution environment while reducing chip costs.

According to a first aspect, an embodiment of this application provides a computer system, including an interrupt status register, a permission management register, a processor, and target storage space. The computer system invokes a target service. The target service is located in a TEE. An invoker that invokes the target service is usually located in an REE. The processor is configured to set, based on a first interrupt triggered by the target service, a flag corresponding to the first interrupt in the interrupt status register to a first interrupt flag, and a flag corresponding to the first interrupt in the permission management register to a first call flag. The first interrupt flag and the first call flag jointly indicate whether access to the target storage space is allowed. The processor is configured to determine, based on the first interrupt flag and the first call flag, whether to allow the processor to access the target storage space, and is configured to obtain first information in the target storage space in a security mode if determining that the processor is allowed to access the target storage space. The processor is further configured to execute the target service based on the first information.

In this embodiment of this application, a lightweight permission management register is disposed in a service processing system, and access permission for the target storage space is managed by the permission management register and the interrupt status register. In this way, the target storage space can be accessed only in a specific security mode (for example, the TEE), to establish a trusted execution environment with high security. The service processing system provided in this embodiment of this application may be applied to various chip architectures, and features a simple design and high universality. In addition, costs of the permission management register are low. Chip costs are effectively reduced while a reliable secure access environment is implemented.

In some implementations, that the first interrupt flag and the first call flag indicate whether access to the target storage space is allowed includes: if the first interrupt flag and the first call flag both indicate that the processor is allowed to access the target storage space, the processor is allowed to access the target storage space; or if the first interrupt flag or the first call flag indicates that the processor is not allowed to access the target storage space, the processor is not allowed to access the target storage space.

This embodiment of this application uses two flags to control the access permission for the target storage space, featuring a simple design. Chip costs are effectively reduced while a reliable secure access environment is implemented.

In some implementations, the first interrupt is a non-maskable interrupt (non maskable interrupt, NMI).

In some implementations, the processor is specifically configured to set the first call flag based on a first interrupt priority.

In some implementations, the processor is specifically configured to determine whether the first interrupt is an interrupt with a highest priority. When determining that the first interrupt is the interrupt with a highest priority, the processor sets the first call flag. When determining that the first interrupt is not the interrupt with the highest priority, the processor is configured to set the first call flag after executing an interrupt with a higher priority than that of the first interrupt.

In this embodiment of this application, the processor processes each interrupt based on an interrupt priority, to ensure that the computer system can correctly respond to each interrupt. This improves reliability of the computer system.

In some implementations, the system further includes: a memory protection unit. The memory protection unit is configured to set a second call flag of the target storage space. The first interrupt flag, the first call flag, and the second call flag jointly indicate whether the access to the target storage space is allowed. The processor is further configured to determine, based on the first interrupt flag, the first call flag, and the second call flag, whether to allow the access to the target storage space.

In this embodiment of this application, the memory protection unit is disposed, and the access permission for the target storage space is jointly managed by the memory protection unit, the interrupt status register, and the permission management register, to further improve security of the service system.

In some implementations, that the first interrupt flag, the first call flag, and the second call flag indicate whether the processor is allowed to access the target storage space includes: if the second call flag indicates that the processor is not allowed to access the target storage space, the processor is not allowed to access the target storage space; if the second call flag indicates that the processor is allowed to access the target storage space, and the first interrupt flag or the first call flag indicate that the processor is not allowed to access the target storage space, the processor is not allowed to access the target storage space; and if the second call flag indicates that the processor is allowed to access the target storage space, and the first interrupt flag and the first call flag both indicate that the processor is allowed to access the target storage space, the processor is allowed to access the target storage space.

It should be noted that there may be multiple implementations of using one or more flags to indicate whether the processor is allowed to access the target storage space. Two flags are used as an example. The two flags may be the first interrupt flag and the first call flag respectively. If the first interrupt flag and the first call flag both indicate that the access to the target storage space is allowed, the processor can access the target storage space. If either the first interrupt flag or the first call flag indicates that the processor is not allowed to access the target storage space, the processor cannot access the target storage space. Three flags are used as an example. The three flags may be: the first interrupt flag, the first call flag, and the second call flag. The three flags may jointly indicate whether the processor is allowed to access the target storage space. A rule is, for example, when the three flags all indicate that the processor is allowed to access the target storage space, the processor can access the target storage space. If any one of the three flags indicates that the processor is not allowed to access the target storage space, the processor is not allowed to access the target storage space. Alternatively, the three flags may independently indicate whether the processor is allowed to access the target storage space. The rule is, for example, when any one of the three flags or a specified flag indicates that the processor is not allowed to access the target storage space, the processor is not allowed to access the target storage space. When all the three flags indicate that the processor is allowed to access the target storage space, the processor may access the target storage space. For a case in which more flags are used to control the access permission for the target storage space, refer to the foregoing implementations in which two or three flags are used to control the access permission for the target storage space, and examples are not listed herein.

In some implementations, the processor is further configured to reset the flag corresponding to the first interrupt in the interrupt status register.

In this embodiment of this application, the flag corresponding to the first interrupt in the interrupt status register is reset in the TEE, to protect the target storage space. This reduces an attack surface of the computer system, and improves security of the computer system.

In some implementations, the processor is further configured to clear and release a resource invoked by the target service based on the first interrupt.

In this embodiment of this application, the computer system may clear and release sensitive information, an intermediate result, and the like that are involved in a heap and a stack invoked by the target service by resetting the flags that corresponds to the first interrupt and that are in an interrupt status register and the permission management register, exit the first interrupt, and return a processing result of the target service, to complete an entire process of the target service.

In some implementations, the target storage space includes one or a plurality of memory cells in a non-volatile memory (non-volatile memory, NVM) and/or a volatile memory (volatile memory).

In some implementations, the plurality of memory cells are a plurality of consecutive memory cells or a plurality of inconsecutive memory cells.

It should be noted that the non-volatile memory may be, for example, a programmable read-only memory (programmable read-only memory, PROM), an electrically rewritable read-only memory (electrically alterable read-only memory, EAROM), an erasable programmable read-only memory (erasable programmable read-only memory, EPROM), an electrically erasable programmable read-only memory (electrically erasable programmable read-only memory, EEPROM), a flash memory (flash memory), or a one-time programming read-only memory (one-time programmable read-only memory, OTPROM). The volatile memory is, for example, a random-access memory (random-access memory, RAM).

In embodiments of this application, the target storage space that stores first information corresponding to different target services may vary with different target services. For example, if first information corresponding to some target services cannot be modified in any case, the target storage space that stores the first information corresponding to the target services may be an OTPROM. For another example, if first information corresponding to some target services needs to keep dynamically changing, the target storage space that stores the first information corresponding to the target services may be, for example, an EPROM.

The memory usually includes a large quantity of memory elements. These memory elements are grouped, and all the memory elements in a group read or write simultaneously. Such a group of memory elements is a memory cell. The memory cell is a basic unit for the processor to access the memory. In this solution, the plurality of memory cells included in the target storage space may be consecutive memory cells or inconsecutive memory cells, so that the computer system provided in this embodiment of this application has high flexibility and is applicable to various types of memories.

According to a second aspect, an embodiment of this application provides a service processing method. The service processing method is applied to the computer system according to any one of the first aspect, and the computer system includes an interrupt status register, a permission management register, a processor, and target storage space. The method is as follows. When the computer system invokes a target service, the computer system sets a first interrupt flag and a first call flag based on a first interrupt triggered by the target service. The target service is located in a TEE, and an invoker that invokes the target service is usually located in an REE. The first interrupt flag and the first call flag indicate whether access to the target storage space is allowed. If it is determined, based on the first interrupt flag and the first call flag, that the access to the target storage space is allowed, first information in the target storage space is obtained in a security mode. The target service is executed based on the first information.

In the service processing method provided in this embodiment of this application, access permission for the target storage space is jointly managed by using the first call flag and the first interrupt flag. In this way, the target storage space can be accessed only in a specific security mode (for example, the TEE), to establish a trusted execution environment with high security. The service processing method provided in this embodiment may be implemented by adding a lightweight permission management register to various chip architectures, and features a simple design and high universality. In addition, costs of the permission management register are low. Chip costs are effectively reduced while a reliable secure access environment is implemented.

In some implementations, that the first interrupt flag and the first call flag indicate whether access to the target storage space is allowed includes: if the first interrupt flag and the first call flag both indicate that the processor is allowed to access the target storage space, the processor is allowed to access the target storage space; or the first interrupt flag or the first call flag indicates that the processor is not allowed to access the target storage space, the processor is not allowed to access the target storage space.

This embodiment of this application uses two flags to control the access permission for the target storage space, featuring a simple design. Chip costs are effectively reduced while a reliable secure access environment is implemented.

In some implementations, the first interrupt is an NMI.

In some implementations, the setting a first interrupt flag and a first call flag based on a first interrupt triggered by the target service includes: setting the first call flag based on a first interrupt priority.

In some implementations, the setting the first call flag based on a first interrupt priority includes: when the first interrupt is an interrupt with a currently highest priority, setting the first call flag; or when the first interrupt is not the interrupt with the currently highest priority, setting the first call flag after executing an interrupt with a higher priority than that of the first interrupt.

In this embodiment of this application, the processor processes each interrupt based on an interrupt priority, to ensure that the computer system can correctly respond to each interrupt. This improves reliability of the computer system.

In some implementations, the method further includes obtaining a second call flag. The first interrupt flag, the first call flag, and the second call flag indicate whether the access to the target storage space is allowed.

In this embodiment of this application, the memory protection unit is disposed, and the access permission for the target storage space is jointly managed by the memory protection unit, to further improve security of the service system.

In some implementations, that the first interrupt flag, the first call flag, and the second call flag indicate whether the processor is allowed to access the target storage space includes: if the second call flag indicates that the access to the target storage space is not allowed, the access to the target storage space is not allowed; if the second call flag indicates that the access to the target storage space is allowed, and the first interrupt flag or the first call flag indicate that the access to the target storage space is not allowed, the access to the target storage space is not allowed; or if the second call flag indicates that the access to the target storage space is allowed, and the first interrupt flag and the first call flag both indicate that the access to the target storage space is allowed, the access to the target storage space is allowed.

It should be noted that there may be multiple implementations of using one or more flags to indicate whether the processor is allowed to access the target storage space. Two flags are used as an example. The two flags may be the first interrupt flag and the first call flag respectively. If the first interrupt flag and the first call flag both indicate that the access to the target storage space is allowed, the processor can access the target storage space. If either the first interrupt flag or the first call flag indicates that the processor is not allowed to access the target storage space, the processor cannot access the target storage space. Three flags are used as an example. The three flags may be: the first interrupt flag, the first call flag, and the second call flag. The three flags may jointly indicate whether the processor is allowed to access the target storage space. A rule is, for example, when the three flags all indicate that the processor is allowed to access the target storage space, the processor can access the target storage space. If any one of the three flags indicates that the processor is not allowed to access the target storage space, the processor is not allowed to access the target storage space. Alternatively, the three flags may independently indicate whether the processor is allowed to access the target storage space. The rule is, for example, when any one of the three flags or a specified flag indicates that the processor is not allowed to access the target storage space, the processor is not allowed to access the target storage space. When all the three flags indicate that the processor is allowed to access the target storage space, the processor may access the target storage space. For a case in which more flags are used to control the access permission for the target storage space, refer to the foregoing implementations in which two or three flags are used to control the access permission for the target storage space, and examples are not listed herein.

In some implementations, the method further includes: resetting the first interrupt flag.

In this embodiment of this application, the flag corresponding to the first interrupt in the interrupt status register is reset in the TEE, to protect the target storage space. This reduces an attack surface of the computer system, and improves security of the computer system.

In some implementations, the method further includes: clearing and releasing a resource invoked by the target service based on the first interrupt.

In this embodiment of this application, the computer system may clear and release sensitive information, an intermediate result, and the like that are involved in a heap and a stack invoked by the target service by resetting the flags that corresponds to the first interrupt and that are in an interrupt status register and the permission management register, exit the first interrupt, and return a processing result of the target service, to complete an entire process of the target service.

In some implementations, the target storage space includes one or a plurality of memory cells in a non-volatile memory and/or a volatile memory.

In some implementations, the plurality of memory cells are a plurality of consecutive memory cells or a plurality of inconsecutive memory cells.

It should be noted that the non-volatile memory may be, for example, a programmable read-only memory (programmable read-only memory, PROM), an electrically rewritable read-only memory (electrically alterable read only memory, EAROM), an erasable programmable read-only memory (erasable programmable read only memory, EPROM), an electrically erasable programmable read-only memory (electrically erasable programmable read only memory, EEPROM), a flash memory (flash memory), or a one-time programming read-only memory (one time programmable read only memory, OTPROM). The volatile memory is, for example, a random-access memory (random-access memory, RAM).

In embodiments of this application, the target storage space that stores first information corresponding to different target services may vary with different target services. For example, if first information corresponding to some target services cannot be modified in any case, the target storage space that stores the first information corresponding to the target services may be an OTPROM. For another example, if first information corresponding to some target services needs to keep dynamically changing, the target storage space that stores the first information corresponding to the target services may be, for example, an EPROM.

The memory usually includes a large quantity of memory elements. These memory elements are grouped, and all the memory elements in a group read or write simultaneously. Such a group of memory elements is a memory cell. The memory cell is a basic unit for the processor to access the memory. In this solution, the plurality of memory cells included in the target storage space may be consecutive memory cells or inconsecutive memory cells, so that the computer system provided in this embodiment of this application has high flexibility and is applicable to various types of memories.

According to a third aspect, an embodiment of this application further provides a readable storage medium. The computer-readable storage medium stores a computer program. The computer program includes at least one segment of code, and the at least one segment of code is executed by a computer, to control the computer to perform the service processing method provided in any embodiment of this application in the second aspect.

The program may be partially stored in a storage medium that is packaged with a processor, or may be partially stored in a memory that is not packaged with a processor.

According to a fourth aspect, an embodiment of this application provides an electronic device, including a memory, a processor, and computer program instructions. The memory stores the computer program instructions, and the processor executes the computer program instructions to perform the service processing method according to any embodiment of this application in the second aspect.

The electronic device may be a terminal device or a network device, or may be a chip used in the terminal device or the network device. The memory and the processor may be integrated on a same chip, or may be separately disposed on different chips.

According to a fifth aspect, an embodiment of this application further provides a processor. The processor includes: at least one circuit, configured to invoke a target service, and set a first interrupt flag and a first call flag based on a first interrupt triggered by the target service. The first interrupt flag and the first call flag jointly indicate whether access to target storage space is allowed. The at least one circuit is configured to obtain first information in the target storage space in a TEE mode if it is determined, based on the first interrupt flag and the first call flag, that the access to the target storage space is allowed. The at least one circuit is also configured to execute the target service based on the first information.

The processor may be a chip.

According to a sixth aspect, an embodiment of this application further provides a chip. The chip includes a functional circuit for implementing any one of the foregoing methods. Alternatively, the chip includes a processor (or referred to as a processor core) and a memory cell. The memory cell includes a computer program. When the computer program is executed by the processor, any one of the foregoing methods is implemented. Alternatively, the chip includes the functional circuit, the processor core, and the memory cell. Some functions of any one of the foregoing methods are implemented in a hardware manner of the functional circuit, and some other functions are implemented in a software manner of the memory cell and the processor.

BRIEF DESCRIPTION OF DRAWINGS

FIG. 3 is a flowchart of a service processing method according to an embodiment of this application;

FIG. 4A and FIG. 4B are a flowchart of a service processing method according to another embodiment of this application;

DESCRIPTION OF EMBODIMENTS

Currently, to resolve a mobile security problem, a concept of a TEE is proposed. The TEE has the following security features: being protected by a hardware mechanism, a quick communication mechanism, and defensibility against a hardware attack. Therefore, the TEE is widely applied to protection of specific sensitive data, a mobile payment service, security authentication, and the like.

In a traditional mode, implementation of the TEE has a high requirement on hardware performance of a device, which results in high hardware costs. For example, when the TEE is implemented based on an ARMv8-M architecture design, the device needs to have a kernel that can support the ARMv8-M architecture. However, costs of the kernel that supports the ARMv8-M architecture are usually high. Especially for some devices that are sensitive to costs and performance, the traditional mode is not applicable, which may cause security risks to the devices.

Based on the problem existing in the conventional technology, an embodiment of this application provides a computer system. The computer system is provided with a lightweight component. The computer system can control access to target storage space by using the lightweight component, so that a device can access the target storage space only in a specific security mode (for example, the TEE), to construct a TEE with high reliability, and execute a service invoked by the system in the TEE. The computer system provided in embodiments of this application features a simple design and high universality, and is applicable to various electronic devices, such as a smartphone, an IPAD, a computer, an Internet-of-Things device, and a server.

It should be noted that the system architecture or the application scenario described in embodiments of this application are intended to describe the technical solutions in embodiments of this application more clearly, and do not constitute a limitation on the technical solutions provided in embodiments of this application. A person skilled in the art may know that: With the evolution of the system architecture and the emergence of new application scenarios, the technical solutions provided in embodiments of this application are also applicable to similar technical problems. Detailed descriptions are provided below with reference to specific embodiments.

Figure 1:
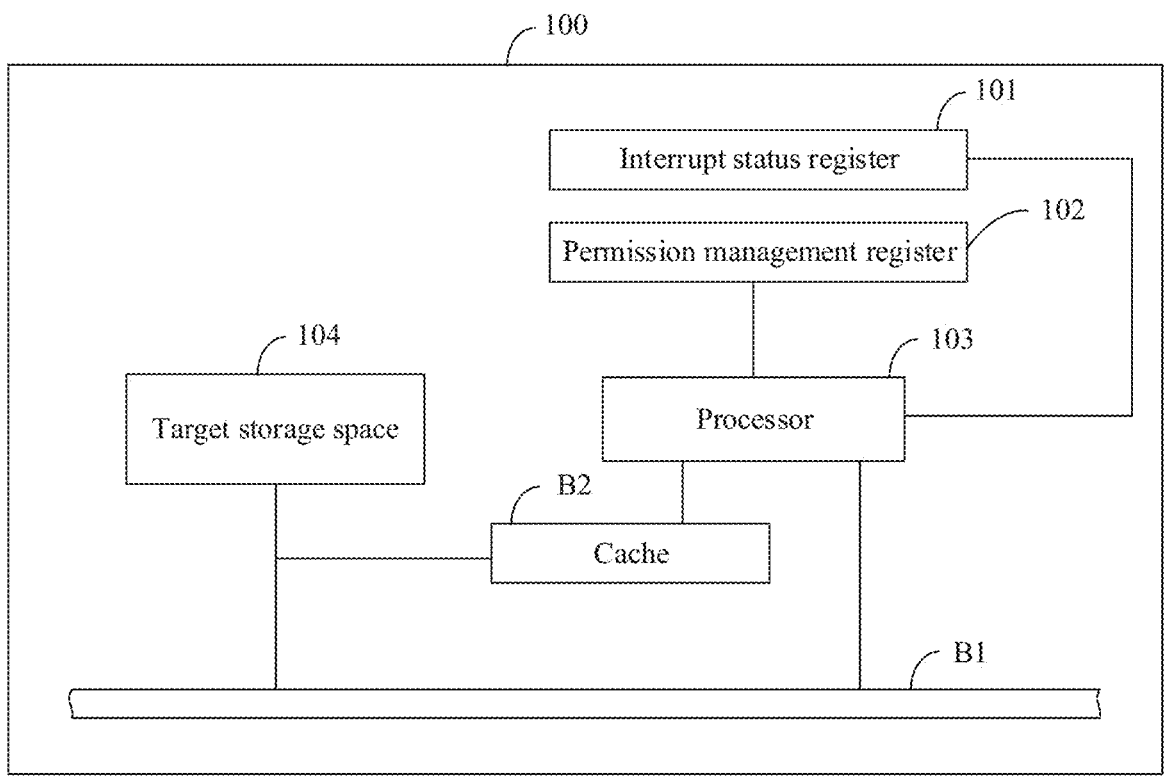
FIG. 1 is a schematic diagram of a structure of a computer system according to an embodiment of this application.

FIG. 1 is a schematic diagram of a structure of a computer system according to an embodiment of this application. As shown in FIG. 1, the computer system 100 includes an interrupt status register 101, a permission management register 102, a processor 103, and target storage space 104.

The interrupt status register 101 is configured to identify an interrupt status. Specifically, the interrupt status register 101 may include one or more flags, and each flag corresponds to one interrupt. When the interrupt is triggered, a flag corresponding to the interrupt in the interrupt status register 101 is set. It should be noted that the computer system may invoke a target service to trigger the interrupt by controlling the interrupt trigger register. Specifically, when the computer system invokes the target service, the processor triggers the interrupt by controlling the interrupt trigger register.

The permission management register 102 is configured to control access permission for the target storage space 104. Specifically, the permission management register 102 may include one or a plurality of flags, and each flag corresponds to one interrupt. If the flag corresponding to the interrupt is set, it indicates that the interrupt can access the corresponding target storage space 104. If the permission management register 102 includes the plurality of flags, it indicates that the permission management register 102 may manage the access permission, by the plurality of interrupts, for the target storage space 104 corresponding to the plurality of interrupts.

Optionally, the plurality of interrupts may correspond to different target storage space 104, or the plurality of interrupts may correspond to same target storage space 104. This is not limited in this embodiment of this application.

In this solution, the permission management register 102 cannot be directly accessed by the user by using code or in another manner. The processor 103 is automatically set only when the first interrupt is triggered and the processor 103 jumps to an entrance of the first interrupt.

It should be noted that, in this solution, the interrupt status register 101 and the permission management register 102 jointly manage the access permission for the target storage space.

The target storage space 104 is configured to store first information, and the first information can be used to execute the target service. For example, the first information may be a root key. For example, the root key may be used for key derivation, and a key encryption key, a working key, and the like that are obtained through derivation may perform a security service. For another example, the root key may be further used for permission authentication. After the permission authentication succeeds, the system may execute the target service. Certainly, the first information in the target storage space 104 may be not only a root key, but also other information or data. The foregoing is merely an example for description, and does not limit the first information.

Optionally, the target storage space 104 may include one or a plurality of memory cells in a non-volatile memory and/or a volatile memory. The non-volatile memory is a memory that can keep stored data after a current is shut off. The non-volatile memory may be, for example, a programmable read-only memory (programmable read-only memory, PROM), an electrically rewritable read-only memory (electrically alterable read only memory, EAROM), an erasable programmable read-only memory (erasable programmable read only memory, EPROM), an electrically erasable programmable read-only memory (electrically erasable programmable read only memory, EEPROM), a flash memory (flash memory), or a one-time programming read-only memory (one time programmable read only memory, OTPROM). The volatile memory is a memory that cannot store data after a current is shut off. The volatile memory is, for example, a random-access memory (random-access memory, RAM). For example, the RAM may be, for example, a static random access memory (Static Random-Access Memory, SRAM) or a synchronous dynamic random access memory (synchronous dynamic random-access memory, SDRAM).

In embodiments of this application, the target storage space that stores first information corresponding to different target services may vary with different target services. For example, if first information corresponding to some target services cannot be modified in any case, the target storage space that stores the first information corresponding to the target services may be an OTPROM. For another example, if first information corresponding to some target services needs to keep dynamically changing, the target storage space that stores the first information corresponding to the target services may be, for example, an EPROM.

Optionally, if the target storage space includes a plurality of memory cells, the plurality of memory cells may be a plurality of consecutive memory cells or a plurality of inconsecutive memory cells. This is not limited in embodiments of this application.

In embodiments of this application, the plurality of memory cells included in the target storage space may be consecutive memory cells or inconsecutive memory cells, so that the computer system provided in embodiments of this application has high flexibility and is applicable to various types of memories.

The processor 103 is a core unit for implementing an operation, and can implement data operation and processing. In a running process, the processor 103 may obtain instructions and data from the memory cell, and complete code running, data processing, peripheral control, and the like. The processor 103 may be, for example, a central processing unit (central processing unit, CPU), a network processor (network processor, NP), a combination of a CPU and an NP, a graphics processing unit (graphics processing unit, GPU), an AI processor, a coprocessor, or a microprocessor.

In this solution, the processor 103 is configured to set, based on the first interrupt triggered by the target service, a flag corresponding to the first interrupt in the interrupt status register 101 to a first interrupt flag, and set a flag corresponding to the first interrupt in the permission management register 102 to a first call flag.

Optionally, the first interrupt is an NMI. The NMI is a type of interrupt request. In this solution, the NMI cannot be disabled.

The processor 103 is further configured to determine, based on the first interrupt flag and the first call flag, whether to allow the processor 103 to access the target storage space 104. If the processor 103 determines that the processor 103 is allowed to access the target storage space 104, the processor 103 is further configured to obtain the first information in the target storage space 104, and execute the target service based on the first information.

In a possible implementation, the processor 103 can access the target storage space 104 by using a system bus B1, to obtain the first information in the target storage space 104. The system bus B1 is an important component for connecting the computer system. Data information, address information, control information, and the like may be transmitted on the system bus B1. In this solution, the processor 103 can access the target storage space 104 by using the system bus B1, and read the first information in the target storage space 104 to another memory cell to execute the target service. The another memory cell herein may be any memory cell other than the target storage space.

In another possible implementation, the processor 103 can access the target storage space 104 by using a cache (cache) B2, to obtain the first information in the target storage space 104.

In some cases, the system bus B1 and the cache B2 may coexist.

In this solution, the interrupt status register 101 and permission management register 102 jointly manage the access permission of the target storage space 104. To be specific, when both the first interrupt flag and the first call flag corresponding to the first interrupt are set, the system enters a TEE (or referred to as a TEE mode) from the REE (or referred to as an REE mode), and the processor 103 can access the target storage space 104 in the TEE.

A working procedure of the computer system provided in this embodiment is as follows. When the system invokes the target service, the system triggers the first interrupt in the REE based on the target service. The processor 103 sets, based on the first interrupt, the flag corresponding to the first interrupt in the first interrupt status register 101 to the first interrupt flag, that is, set the flag corresponding to the first interrupt in the interrupt status register 101. In addition, the processor 103 sets, based on the first interrupt, the flag corresponding to the first interrupt in the permission management register 102 to the first call flag, that is, set the flag corresponding to the first interrupt in the permission management register 102. When the processor 103 determines, based on the first interrupt flag and the first call flag, that access to the target storage space 104 is allowed, the computer system enters the TEE from the REE, and the processor 103 obtains the first information in the target storage space 104 in the TEE, and executes the target service based on the first information in the TEE.

In an actual application, the computer system may invoke a plurality of services, and each service triggers one interrupt. The computer system may preset a corresponding priority for each interrupt based on an interrupt type, a service type, or another factor, so that the system may sequentially execute the interrupts based on priorities of the interrupts.

If a plurality of interrupts are currently unprocessed in the computer system, the processor 103 is specifically configured to: set the flag corresponding to the first interrupt in the interrupt status register 101 to the first interrupt flag when the first interrupt is triggered based on the target service, and set the flag corresponding to the first interrupt in the permission management register 102 to the first call flag based on the first interrupt priority.

In this case, a working procedure of the computer system is as follows. When the computer system invokes the target service, the system triggers the first interrupt in the REE based on the target service. The processor 103 sets, based on the first interrupt, the flag corresponding to the first interrupt in the first interrupt status register 101 to the first interrupt flag, that is, set the flag corresponding to the first interrupt in the interrupt status register 101. The processor 103 determines, based on the first interrupt priority, whether the first interrupt is an interrupt with a currently highest priority. If determining that the first interrupt is the interrupt with the currently highest priority, the processor 103 sets the flag corresponding to the first interrupt in the permission management register 102 to the first call flag, that is, set the flag corresponding to the first interrupt in the permission management register 102. If determining that the first interrupt is not the interrupt with the currently highest priority, the processor 103 sets the flag corresponding to the first interrupt in the permission management register 102 to the first call flag after executing an interrupt with a higher priority than that of the first interrupt. Then, when the processor 103 determines, based on the first interrupt flag and the first call flag, that the access to the target storage space 104 is allowed, the computer system enters the TEE from the REE, and the processor 103 obtains the first information in the target storage space 104 in the TEE, and executes the target service based on the first information in the TEE.

In this embodiment, a lightweight permission management register is disposed in the computer system, and access permission for the target storage space is managed by the permission management register and the interrupt status register. In this way, the target storage space can be accessed only in a specific security mode (for example, the TEE), to establish a TEE with high security. The computer system provided in this embodiment may be applied to various chip architectures, and features a simple design and high universality. In addition, costs of the permission management register are low, and a size and a volume of a required logic circuit are small. Chip costs are effectively reduced while a reliable trusted execution environment is implemented.

Figure 2:
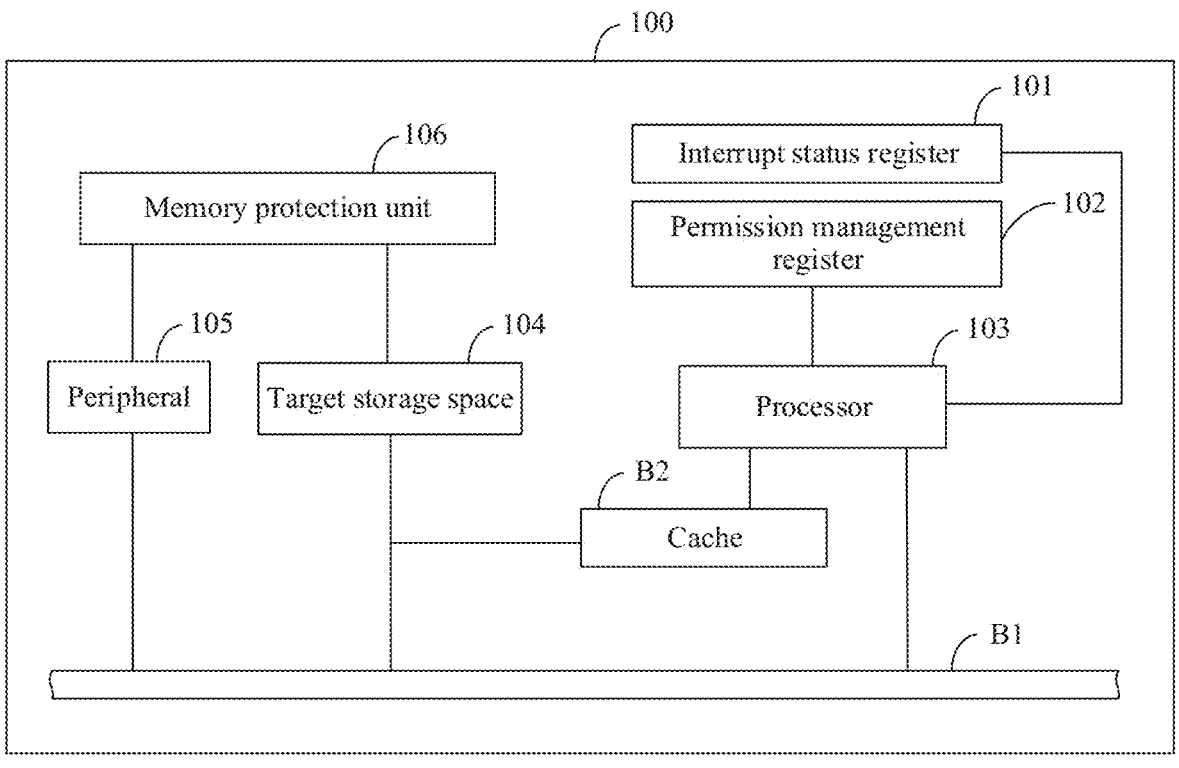
FIG. 2 is a schematic diagram of a structure of a computer system according to another embodiment of this application.

FIG. 2 is a schematic diagram of a structure of a computer system according to another embodiment of this application. As shown in FIG. 2, based on the embodiment shown in FIG. 1, the computer system provided in this embodiment further includes a memory protection unit 106.

The memory protection unit 106 is configured to set a second call flag of the target storage space 104. A first interrupt flag, a first call flag, and the second call flag jointly indicate whether access to the target storage space 104 is allowed. In this solution, the memory protection unit 106 can manage access permission of the target storage space 104, specifically including read, write, execute, and zone lock permission. Optionally, the memory protection unit 106 may be further configured to configure access permission for other storage space. The another storage space is storage space different from the target storage space. For example, the memory protection unit 106 may configure protection permission for memory space.

For example, the memory protection unit 106 is a unit that can manage hardware access permission for a system resource. The memory protection unit 106 may be, for example, an MPU unit of an ARM, or may be a PMP unit of RISC-V. Certainly, the memory protection unit 106 may alternatively be a unit of another type, provided that the memory protection unit 106 has a function of managing access permission for a system hardware resource.

For example, the system resource access permission configured by the memory protection unit 106 for the processor 103 may be shown in Table 1:

TABLE 1

|  | Non-first interrupt | First interrupt |
|---|---|---|
| Normal memory | (RWXL) | (RWXL) |
| Peripheral space | (RWXL) | (RWXL) |
| Target storage space | — | (RWXL) |
| Interrupt vector table | (R) XL | (R) XL |
| Interrupt handler function | (R) XL | (R) XL |

In Table 1, R indicates read permission, W indicates write permission, X indicates execution permission, and L indicates configuration zone lock permission.

For the access permission shown in Table 1, the processor 103 may have the read, write, execution, and configuration zone lock permission for both the normal memory and the peripheral space in the case of the first interrupt and the non-first interrupt. The processor 103 does not have the read, write, execution, and configuration zone lock permission for the target storage space 104 only in the case of the first interrupt. The processor 103 has the read permission for the interrupt vector table and the interrupt handler function in the case of the first interrupt and the non-first interrupt. The interrupt vector table and the interrupt handler function have the execution permission and the configuration zone lock permission.

It should be noted that the memory protection unit 106 may further configure access permission for the interrupt vector table and the interrupt handler function, which is specifically shown in Table 1. Certainly, the memory protection unit 106 may also configure other access permission for the target storage space, the interrupt vector table, and the interrupt handler function. For example, the processor 103 does not have the read permission for the interrupt vector table and the interrupt handler function in the case of the first interrupt and the non-first interrupt. However, the interrupt vector table and interrupt handler function have the execute permission and the configuration zone lock permission.

In an actual application, for different system resources, the foregoing permission may be combined based on an actual requirement. For example, for the target storage space, the processor 103 may be configured to have the read permission but no write, execution, or configuration zone lock permission in the case of the first interrupt. For the interrupt vector table and the interrupt handler function, the processor 103 may be configured to have the execution permission and the configuration zone lock permission but no read permission in the case of both the first interrupt and the non-first interrupt.

Optionally, the memory protection unit 106 may configure the system resource access permission when the system is in an initialization stage or in an idle state. Specifically, the memory protection unit 106 may configure the access permission of the processor 103 for the target storage space 104 when the system is in the initialization stage or in the idle state. The permission may be shown in Table 1.

Optionally, a priority of the access permission for the target storage space 104 that is managed by the memory protection unit 106 is higher than a priority of the access permission for the target storage space 104 that is jointly managed by the permission management register 102 and the interrupt status register 101, that is, a priority of the second call flag is higher than a priority of the first call flag and a priority of the first interrupt flag.

Specifically, if the second call flag indicates that the processor 103 is not allowed to access the target storage space 104, the processor 103 cannot access the target storage space 104 regardless of whether the first call flag and the first interrupt flag jointly determine whether the processor 103 is allowed access the target storage space 104.

If the second call flag indicates that the processor 103 is allowed to access the target storage space 104, and the first call flag and the first interrupt flag jointly determine that the processor 103 is allowed to access the target storage space 104, the processor 103 can access the target storage space 104 when entering the first interrupt. In this case, it indicates that the system is currently in a TEE mode, and the processor 103 performs a trusted operation.

If the second call flag indicates that the processor 103 is not allowed to access the target storage space 104, but the first call flag and the first interrupt flag jointly determine that the processor 103 is not allowed to access the target storage space 104, the processor 103 cannot access the target storage space 104. This case may occur because the processor 103 is in the non-first interrupt. In this case, this permission management mechanism protects the first information in the target storage space 104 from being tampered with, so as to protect system security.

In this embodiment, a lightweight permission management register is disposed in the computer system, and access permission for the target storage space is managed by the permission management register and the interrupt status register. In this way, the target storage space can be accessed only in a specific TEE mode, and a TEE with high security is established. The computer system provided in this embodiment may be applied to various chip architectures, and features high universality. In addition, costs of the permission management register are low. Chip costs are effectively reduced while a reliable trusted execution environment is implemented. The computer system provided in this embodiment is provided with the memory protection unit, and the access permission for the target storage space is jointly managed by the memory protection unit, to further improve security of the service system.

Optionally, based on the embodiments shown in FIG. 1 and FIG. 2, the processor 103 is further configured to reset a flag corresponding to the first interrupt in the interrupt status register. Specifically, after executing a target service based on the first information, the processor 103 may reset the flag corresponding to the first interrupt in the interrupt status register. In this solution, the flag corresponding to the first interrupt in the interrupt status register is reset in the TEE mode, to protect the target storage space and reduce an attack surface of the computer system.

Optionally, based on the embodiments shown in FIG. 1 and FIG. 2, the processor 103 is further configured to clear and release a resource invoked by the target service based on the first interrupt. Specifically, after executing the target service based on the first information, the processor 103 may invoke a related program based on the first interrupt, to clear and release the system resource invoked by the target service.

Optionally, based on the embodiments shown in FIG. 1 and FIG. 2, the processor 103 is further configured to reset a flag corresponding to the first interrupt in the permission management register. Specifically, after executing the target service and clearing and releasing the resource invoked by the target service, the processor 103 may reset the flag corresponding to the first interrupt in the permission management register and exit the first interrupt.

Optionally, after exiting the first interrupt, the computer system may further return a processing result of the target service to an invoker of the target service. Specifically, if the target service is triggered by a user application, the computer system returns the processing result to the user application. Alternatively, if the target service is triggered by an operating system, the computer system returns the processing result to the operating system.

The computer system clears and releases the resource invoked by the target service by resetting the flag corresponding to the first interrupt in the interrupt status register and the permission management register, exits the first interrupt, and returns a processing result of the target service, to complete an entire process of the target service.

Optionally, based on the embodiments shown in FIG. 1 and FIG. 2, the computer system 100 further includes a peripheral 105. The peripheral 105 (which may also be referred to as a peripheral device, an external device, or another name) is a controller inside a chip that controls a peripheral device and a bus. The peripheral 105 is, for example, an I2C (inter-integrated circuit) bus controller, or a secure digital input and output card (secure digital input and output card, SDIO) bus controller.

FIG. 3 is a flowchart of a service processing method according to an embodiment of this application. The service processing method provided in this embodiment may be applied to the computer system shown in FIG. 1 or FIG. 2. As shown in FIG. 3, the method in this embodiment includes the following steps.

S101: Invoke a target service, and trigger a first interrupt based on the target service.

Specifically, a computer system invokes the target service in an REE, and triggers the first interrupt based on the target service. The target service may be triggered by a user application. The user application may be, for example, a third-party application, or a system application.

Specifically, the computer system may invoke the target service in an REE threaded mode, and trigger the first interrupt based on the target service. Optionally, the first interrupt may be an NMI. The threaded mode is an operating mode of a processor when general code is running, and may be a kernel mode or a user mode (user mode). The kernel mode and user mode are operating modes of the processor, as well as mechanisms that can protect data and prevent malicious behavior.

S102: Set a first interrupt flag and a first call flag based on the first interrupt.

Specifically, the processor of the computer system configures, based on the first interrupt triggered by the target service, the first interrupt flag corresponding to the first interrupt in the interrupt status register, and configures, based on the first interrupt, the first interrupt flag corresponding to the first interrupt in the permission management register. For the interrupt status register and the permission management register, refer to the detailed descriptions in the embodiment shown in FIG. 1. Details are not described herein again.

Specifically, the process in which the processor configures, based on the first interrupt, the first interrupt flag corresponding to the first interrupt in the interrupt status register and the first interrupt flag corresponding to the first interrupt in the permission management register is controlled by hardware, and inaccessible by software. This ensures security of the permission management register in a work process, so as to implement a secure access environment.

S103: Determine, based on the first interrupt flag and the first call flag, whether to allow the access to the target storage space.

In this solution, the first interrupt flag and the first call flag indicate whether the processor is allowed to access the target storage space. If the processor determines, based on the first interrupt flag and the first call flag, that the processor is allowed to access the target storage space, S104 is performed. If the processor determines, based on the first interrupt flag and the first call flag, that the processor is not allowed to access the target storage space, the computer system may return related indication information indicating that execution of the target service is rejected. Returning of related indication information indicating that execution of the target service is rejected can ensure a correct response to interrupt by the computer system, and security of first information stored in the target storage space.

S104: Obtain the first information in the target storage space in a TEE mode.

Specifically, if the processor determines, based on the first interrupt flag and the first call flag, that the processor is allowed to access the target storage space, the computer system enters the TEE mode from an REE mode. The computer system obtains the first information in the target storage space in the TEE mode, and jumps to an entrance of a corresponding interrupt based on an interrupt vector table in the TEE mode.

The processor can access the target storage space in the TEE mode by using a system bus or a cache, to obtain the first information in the target storage space. For the first information in the target storage space, refer to the foregoing detailed descriptions. Details are not described herein again.

S105: Execute the target service based on the first information.

Specifically, the computer system performs processing related to the target service based on the first information. For example, if the first information is a root key, the computer system may perform related operations such as permission authentication and key derivation based on the root key, and may execute the target service based on a key encryption key, a working key, and the like that are obtained through the key derivation.

It should be noted that, when the computer system performs S104 and S105, the processor may work in a TEE handler (handler) mode. The handler mode is an operating mode of the processor during an interrupt and exception handling, and is usually a kernel mode. An application program cannot unrestrictedly enter the kernel mode, and can enter the kernel mode only by invoking an interface provided by a system or passively enter the kernel mode due to an interrupt. Therefore, the processor executes the target service in the TEE handler mode, so as to prevent the application program from performing an unauthorized operation, ensuring security of the target service.

It should be noted that the operating mode of the processor may vary with an architecture or a design of the processor, and is merely an example in this embodiment.

In the service processing method provided in this embodiment, access permission for the target storage space is jointly managed based on the first call flag and the first interrupt flag. In this way, the target storage space can be accessed only in a specific security mode (for example, the TEE mode), establishing a secure access environment with high security. The service processing method provided in this embodiment may be implemented by adding a lightweight permission management register to various chip architectures, and features a simple design and high universality. In addition, costs of the permission management register are low. Chip costs are effectively reduced while a reliable secure access environment is implemented.

Figure 4A:
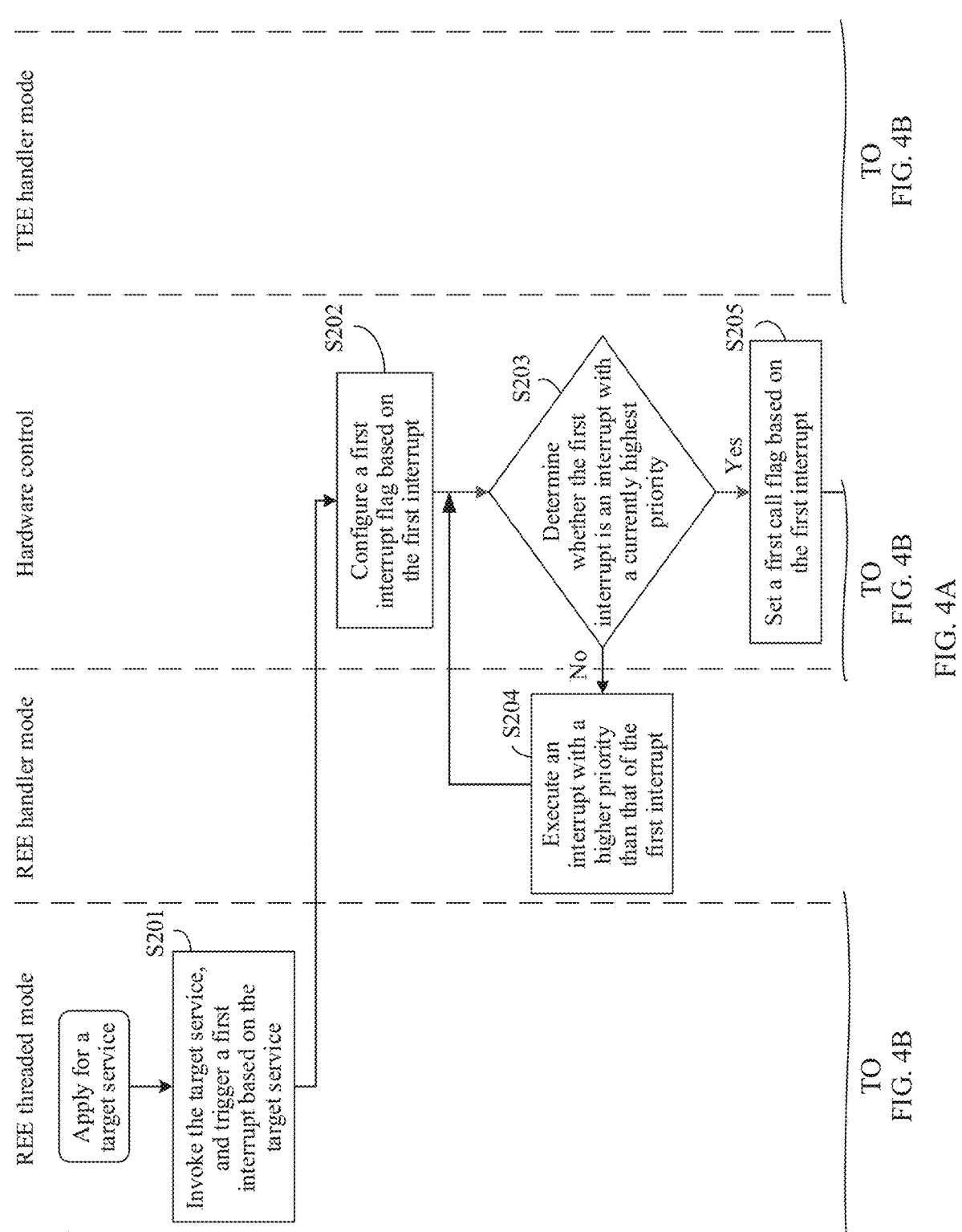

FIG. 4A and FIG. 4B are a flowchart of a service processing method according to another embodiment of this application. As shown in FIG. 4A and FIG. 4B, the method in this embodiment includes the following steps.

S201: Invoke a target service, and trigger a first interrupt based on the target service.

Step S201 in this embodiment is similar to S101 in the embodiment shown in FIG. 3. For details, refer to the descriptions in the embodiment shown in FIG. 3. Details are not described herein again.

S102 in the embodiment shown in FIG. 3 may include S202 to S205 in this embodiment.

S202: Set a first interrupt flag based on the first interrupt.

S203: Determine whether the first interrupt is an interrupt with a currently highest priority. If no, S204 and S205 are performed. If yes, S205 is performed.

S204: Execute an interrupt with a higher priority than that of the first interrupt.

For example, a computer system may execute, in an REF handler mode, the interrupt with the higher priority than that of the first interrupt. It should be noted that, the computer system may execute, in the REE handler mode, the interrupt with the higher priority than that of the first interrupt, or may execute, in a TEE handler mode, the interrupt with the higher priority than that of the first interrupt. This execution may be determined based on an interrupt to be performed, may be determined based on a service corresponding to the interrupt to be performed, or may be performed in a mode specified by a system. This is not limited in this embodiment of this application. This embodiment is merely an example, and does not limit an operating mode of a processor when the interrupt with the higher priority than that of the first interrupt is executed.

S205: Set a first call flag based on the first interrupt.

Because there may be a plurality of interrupts currently unprocessed in the computer system, the computer system may set a flag corresponding to the first interrupt in a permission management register to the first call flag based on a first interrupt priority. A principle of configuring the first call flag based on the first interrupt priority is as follows: When the first interrupt is the interrupt with the currently highest priority, set the flag corresponding to the first interrupt in the permission management register to the first call flag.

S206: Determine, based on the first interrupt flag and the first call flag, whether access to target storage space is allowed.

In this solution, the first interrupt flag and the first call flag indicate whether the processor is allowed to access the target storage space. If the processor determines, based on the first interrupt flag and the first call flag, that the processor is allowed to access the target storage space, S104 is performed. If the processor determines, based on the first interrupt flag and the first call flag, that the processor is not allowed to access the target storage space, the computer system may return related indication information indicating that execution of the target service is rejected. Returning of related indication information indicating that execution of the target service is rejected can ensure a correct response to interrupt by the computer system, and security of first information stored in the target storage space.

S207: Obtain the first information in the target storage space in a TEE mode.

S208: Execute the target service based on the first information.

Steps S206 to S208 in this embodiment is similar to steps S103 to S106 in the embodiment shown in FIG. 3. For details, refer to the descriptions in the embodiment shown in FIG. 3. Details are not described herein again.

In the service processing method provided in this embodiment, access permission for the target storage space is jointly managed based on the first call flag and the first interrupt flag. In this way, the target storage space can be accessed only in a specific security mode (for example, the TEE mode), to establish a TEE with high security. The service processing method provided in this embodiment may be implemented by adding a lightweight permission management register to various chip architectures, and features a simple design and high universality. In addition, costs of the permission management register are low. Chip costs are effectively reduced while a reliable secure access environment is implemented.

Optionally, in some embodiments, after the executing the target service based on the first information in S208, the following steps may be further included.

S209: Reset the first interrupt flag.

S210: Clear and release a resource invoked by the target service based on the first interrupt.

S211: Reset the first call flag.

S213: Exit the first interrupt.

S213: Return the target service.

In an actual application, the computer system may clear and release sensitive information, an intermediate result, and the like that are involved in a heap and a stack invoked by the target service by resetting the flags that correspond to the first interrupt and that are in an interrupt status register and the permission management register, exit the first interrupt, and return a processing result of the target service, to complete an entire process of the target service.

It should be noted that in some embodiments, S209 may alternatively be performed before S208. Specifically, if the system determines that the target storage space does not need to be accessed, S209 may be performed. In this case, S209 and S208 may be performed concurrently, or S209 may be performed before S208. Before resetting the first interrupt flag, the processor can access the target storage space for a plurality of times based on the first interrupt flag and the first call flag.

Figure 5A:
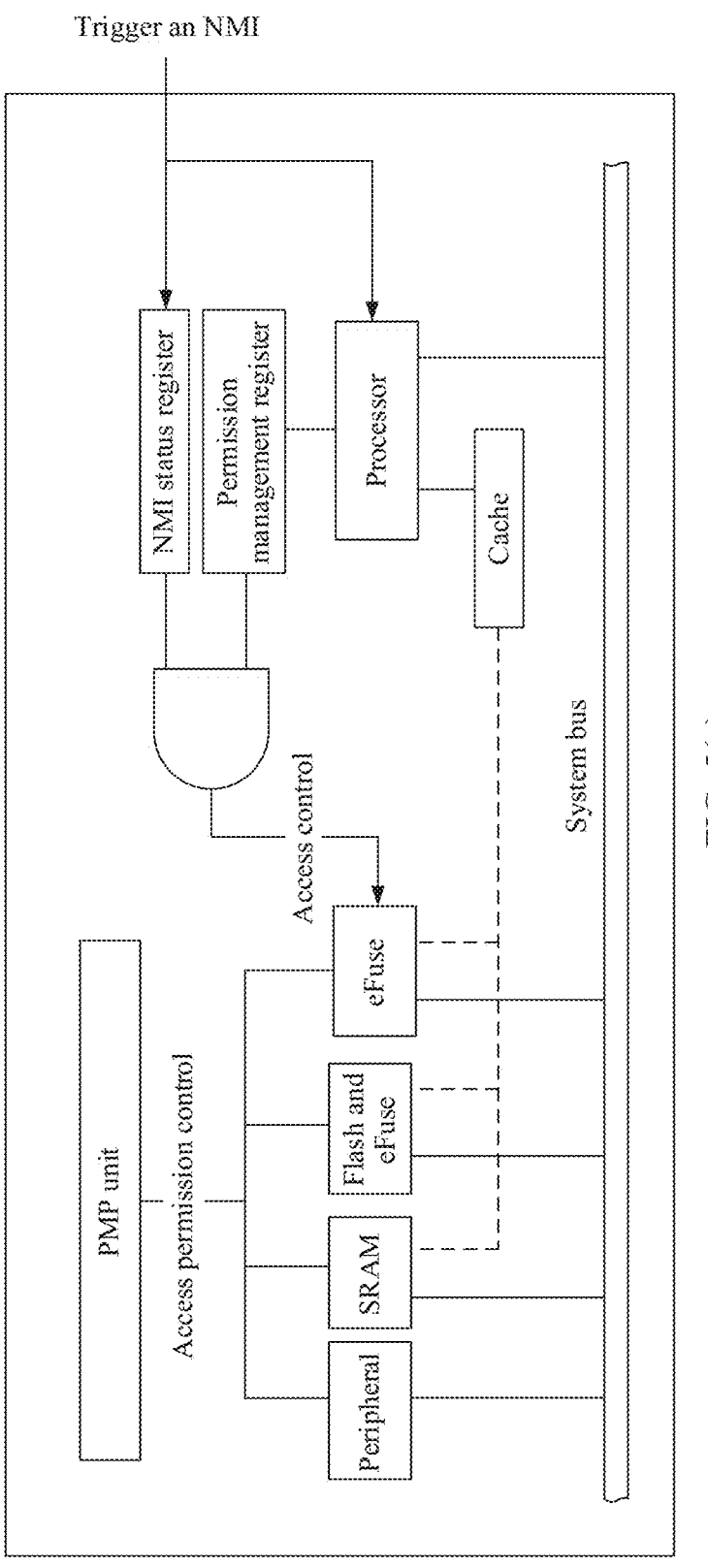
FIG. 5(a) and FIG. 5(b) are a schematic diagram of a structure of a computer system according to another embodiment of this application and a flowchart of executing a security service by the computer system.
Figure 5B:
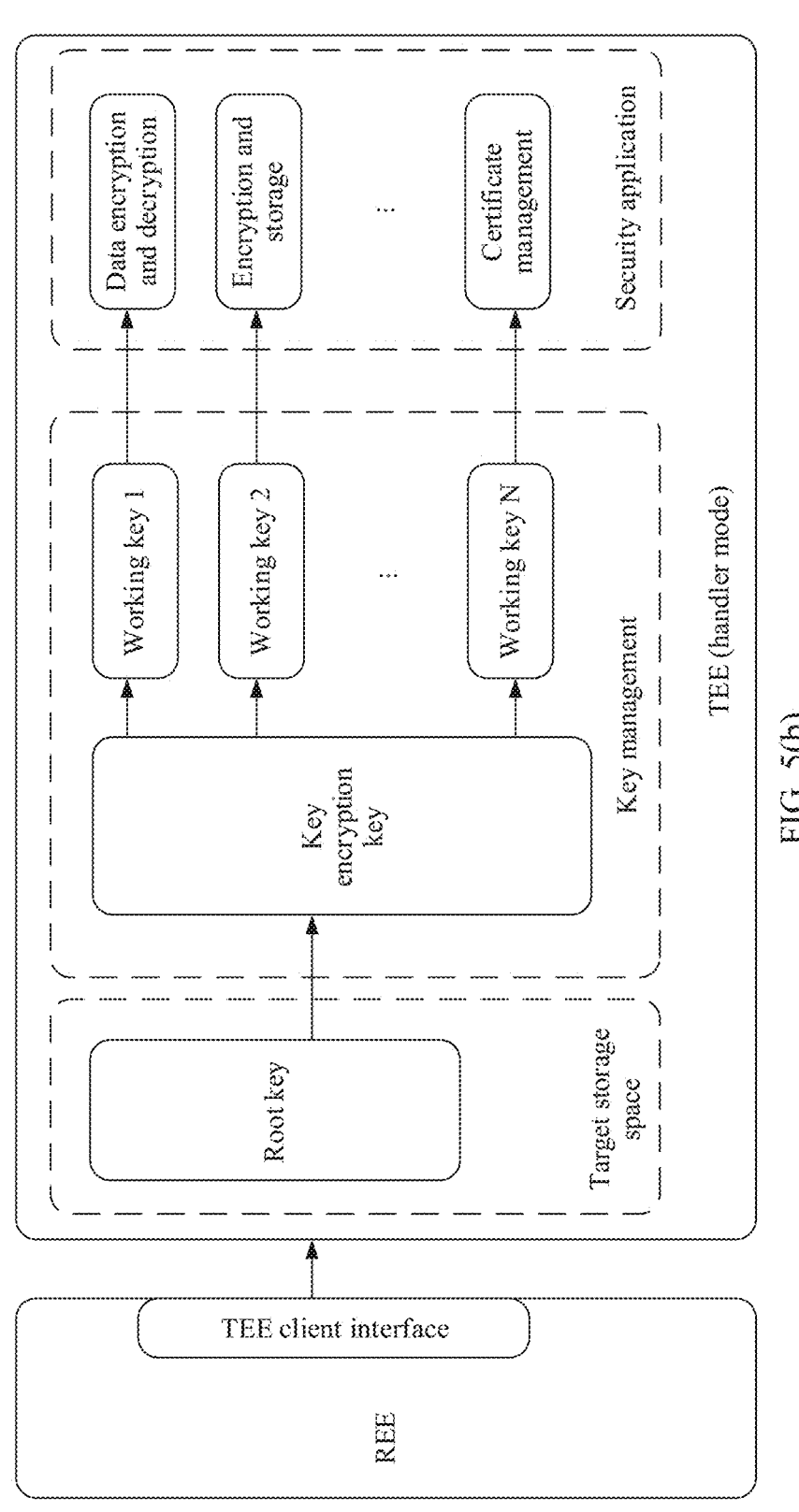

In a specific embodiment, the computer system and the service processing method provided in embodiments of this application are described in detail with reference to FIG. 5(a) and FIG. 5(b). FIG. 5(a) shows a schematic diagram of a structure of a computer system. FIG. 5(b) shows a process of executing a security service by the computer system in FIG. 5(a).

As shown in FIG. 5(a), the computer system includes a CPU, an NMI status register, a permission management register, a PMP unit, and target storage space (that is, an eFuse shown in FIG. 5(*a*)). Optionally, the computer system may further include an SRAM, a flash and an eFuse, and a peripheral.

In the computer system shown in FIG. 5(*a*), the CPU is connected to and accesses the eFuse, the SRAM, the Flash and the eFuse, and the peripheral through a system bus.

The NMI status register is cleared by default upon the system startup and set after an NMI is triggered.

The permission management register is cleared by default upon the system startup and inaccessible by software. When the system jumps to an entrance of the NMI, the permission management register is automatically sets by the CPU.

Only when the NMI status register and the permission management register are both set, the system bus and a cache (cache) are allowed to access the target storage space. In other words, only when the NMI status register and the permission management register are both set, the CPU is allowed to access the eFuse through the system bus or the cache.

If the computer system includes the PMP unit, the PMP unit may configure access permission for a system resource. To be specific, the PMP unit may control access permission for the eFuse, the SRAM, the Flash and the eFuse, and the peripheral. Specifically, if the PMP unit configures the CPU to have the access permission for the eFuse, the CPU is allowed to access the eFuse only when the NMI status register and the permission management register are both set. If the PMP unit configures the CPU not to have the access permission for the eFuse, the CPU is not allowed to access the eFuse regardless of whether the NMI status register and the permission management register are set.

A root key of a device is stored in the target storage space (eFuse). The root key is the first information described in the foregoing embodiments. In this embodiment, the root key executes a secure service. In this embodiment, the eFuse can be programmed only once so that the root key cannot be tampered with.

In the embodiment shown in FIG. 5(*a*), the root key stored in the eFuse may be used for the security service, for example, key data encryption and decryption, key encryption, key management, and certificate management. With reference to FIG. 5(*a*) and FIG. 5(*b*), when the secure service is invoked, the computer system stores the root key in a TEE client interface eFuse, performs key management based on the root key to obtain a working key, and executes the corresponding secure service based on the working key.

Figure 6:
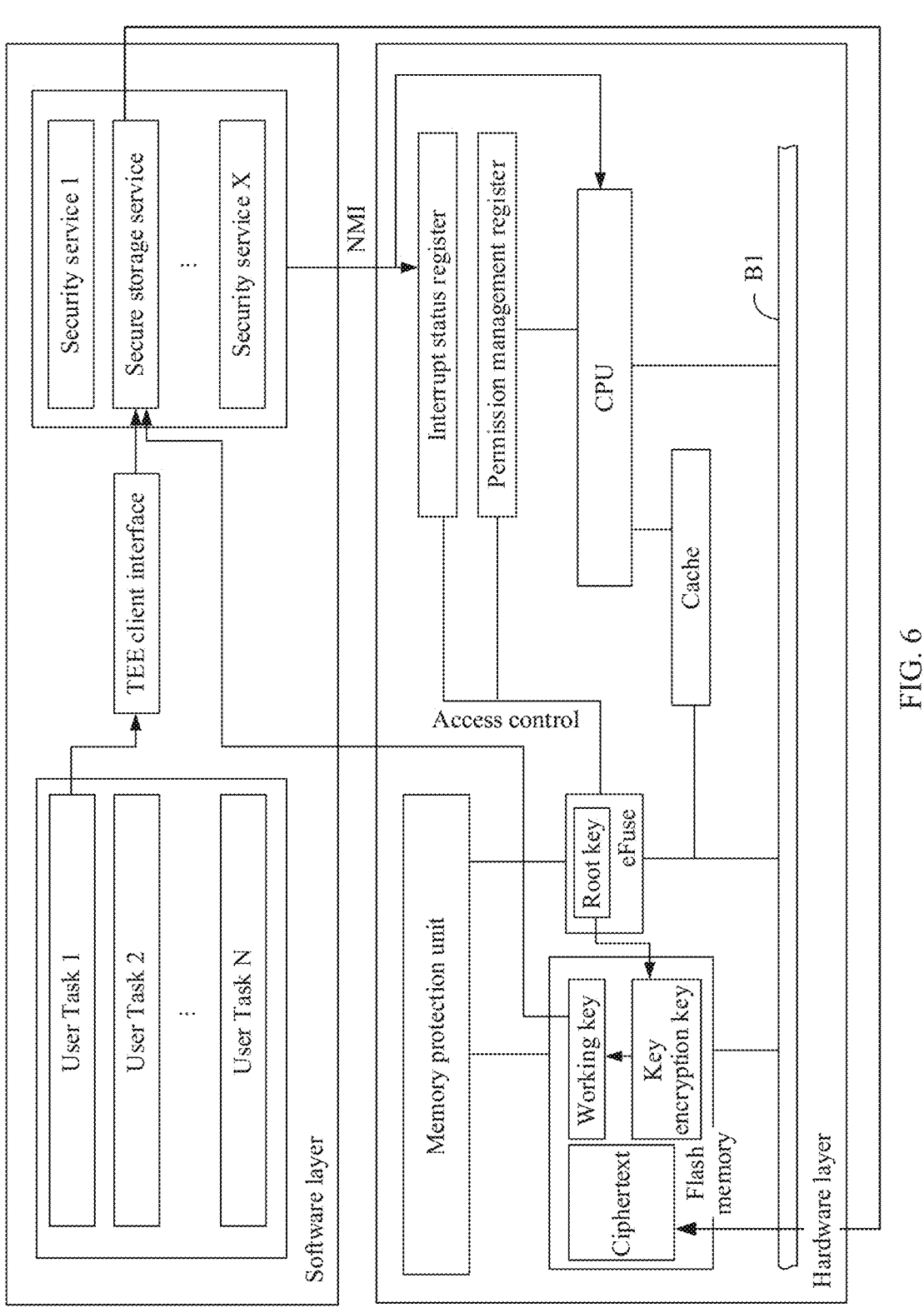
FIG. 6 is a schematic diagram of an architecture of a computer system according to another embodiment of this application.
Figure 7A:
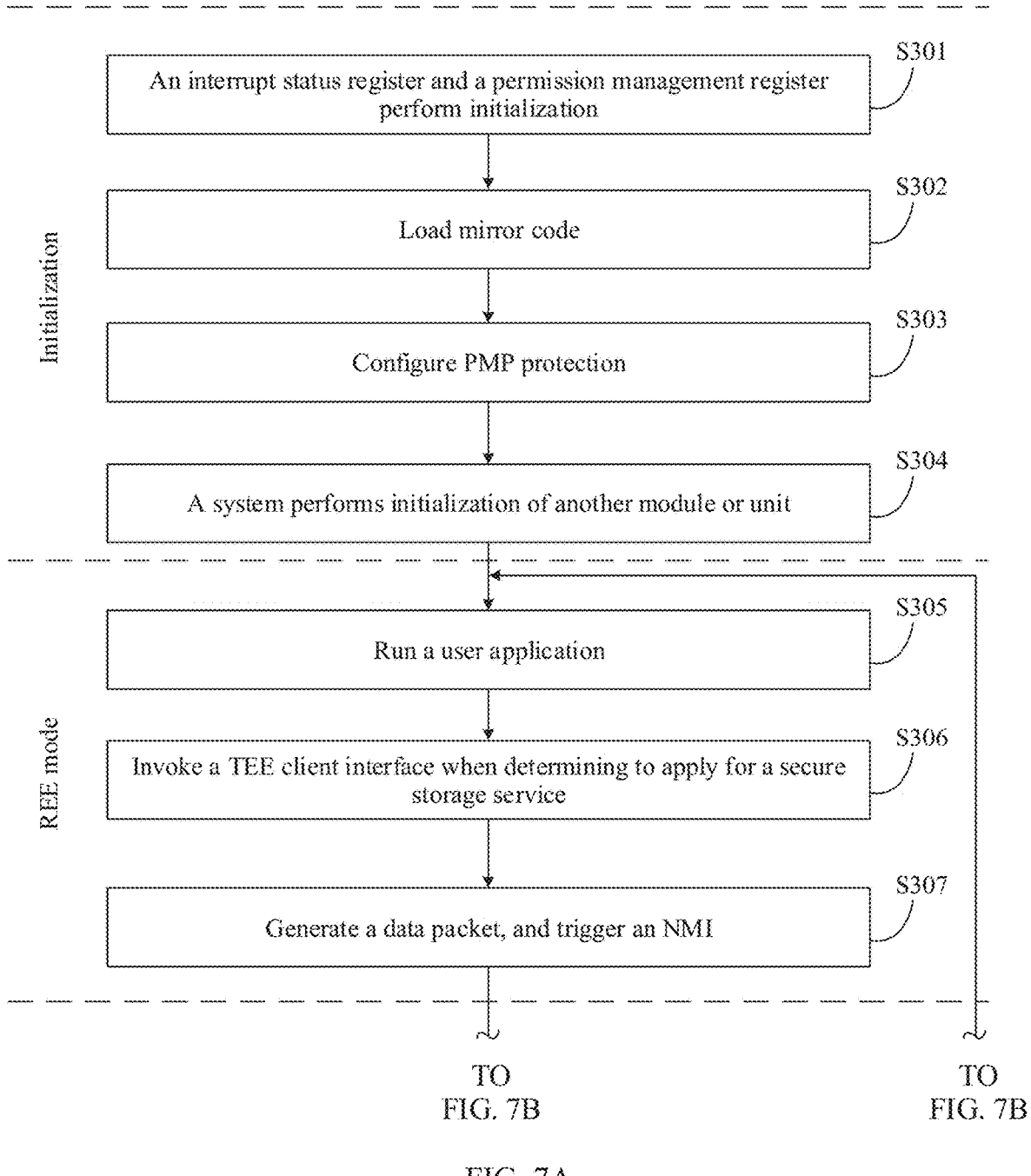
FIG. 7A and FIG. 7B are a flowchart of a service processing method according to another embodiment of this application.
Figure 7B:
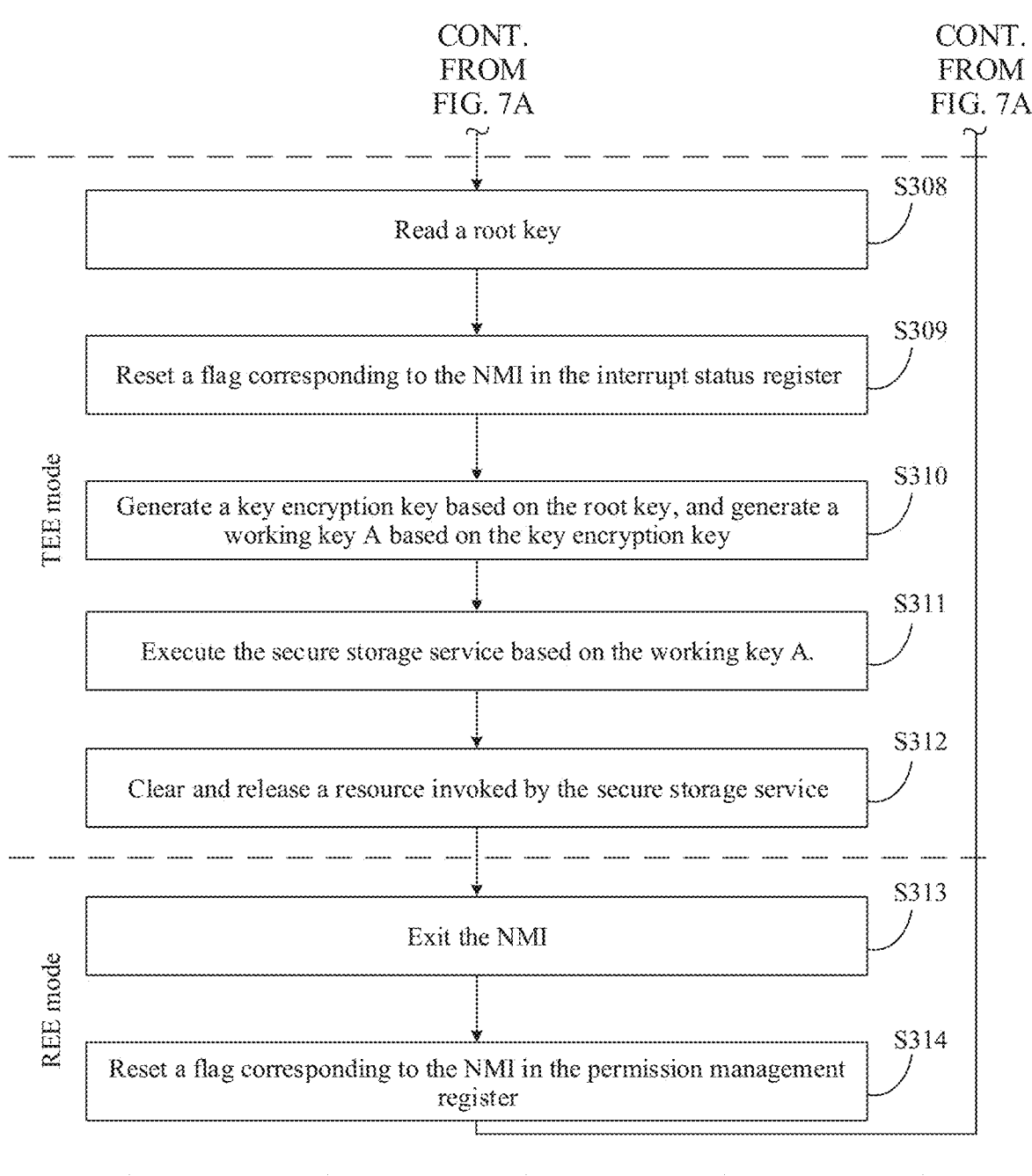

In another specific embodiment, an application by a user task for encrypted storage to store sensitive data is described in detail with reference to FIG. 6, and FIG. 7A and FIG. 7B. FIG. 6 shows a schematic diagram of an architecture of a computer system during execution of a secure storage service. FIG. 7A and FIG. 7B show a process of executing the security service.

As shown in FIG. 6, a user may run N user tasks at a software layer based on an operating system. N is a positive integer. In a running process, a user task 1 may apply for the secure storage service, and trigger an NMI. The secure storage service is intended to encrypt and store the sensitive data, and the secure storage service is the target service in the foregoing embodiments. A hardware layer includes a CPU, a permission management register, an interrupt status register, an eFuse, and a flash. The eFuse stores a root key. The flash may store a key encryption key and a working key that are derived based on the root key, and may further store a ciphertext obtained by encrypting the sensitive data based on the working key.

7A and FIG. 7B show execution of a secure storage service based on the system architecture shown in FIG. 6. The following steps may be specifically included.

S301: The interrupt status register and the permission management register perform initialization.

Specifically, the interrupt status register and the permission management register may be automatically cleared by hardware when the system is powered on.

S302: Load mirror code.

The mirror code may include but is not limited to an interrupt vector table, executable code, and the like.

S303: Configure PMP protection.

Specifically, access permission for a system resource is configured by using a PMP unit. For example, access permission for the interrupt vector table and the NMI processing function is configured to be readable, executable, and unwritable, and the register is locked.

S304: The system performs initialization of another module or unit.

S305: Start an operating system and run a user application.

S306: Invoke a TEE client interface when determining to apply for a secure storage service.

Specifically, during running the user application, when determining that the secure storage service needs to be provided, the user application transfers, by using a TEE client interface (TEE Client API), parameters for the secure storage service, such as a service type, a plaintext address, and a ciphertext storage address, to apply for the secure storage service.

S307: Generate a data packet, and trigger the NMI.

Specifically, the TEE Client API may first verify validity of the foregoing parameters, and after verification succeeds, generate the data packet based on the foregoing parameters and other information, to trigger the NMI.

S308: Read the root key.

Specifically, the CPU sets, based on the NMI, a flag corresponding to the NMI in the interrupt status register, and a flag corresponding to the NMI in the permission management register. Then the CPU determines, based on an interrupt flag and a call flag that correspond to the NMI, whether to allow the CPU to access the root key stored in the eFuse. If determining that the CPU is allowed to access the eFuse, the CPU reads the root key stored in the eFuse.

It should be noted that, if a plurality of interrupts are currently unexecuted in the computer system, the CPU sets the flag corresponding to the NMI in the interrupt status register, and determines whether the NMI is an interrupt with a currently highest priority. If yes, the CPU sets the flag corresponding to the NMI in the permission management register. If no, the CPU sets the flag corresponding to the NMI in the permission management register after executing an interrupt with a higher priority than that of the NMI.

S309: Reset the flag corresponding to the NMI in the interrupt status register.

S310. Generate the key encryption key based on the root key, and generate a working key A based on the key encryption key.

Specifically, the CPU obtains the key encryption key based on the root key, and performs decryption by using the key encryption key with reference to the data packet generated in step S307, to obtain the working key A for the secure storage service.

In an actual application, one service may correspond to a plurality of working keys. A plurality of different services may correspond to one working key. Selection and derivation of the working key, and service invocation are implemented through the TEE Client API.

S311: Execute the secure storage service based on the working key A.

Specifically, the plaintext information is encrypted and stored based on the working key A as well as the plaintext information and the ciphertext storage address that are included in the data packet.

S312: Clear and release a resource invoked by the secure storage service.

Specifically, sensitive information, an intermediate result, and the like that are involved in a heap and a stack used during execution of the secure storage service are cleared.

S313: Exit the NMI.

S314: Reset the flag corresponding to the NMI in the permission management register.

Then the user application may be returned to.

In the foregoing process, S309 may also be performed after S310 or S311, and is not limited to the foregoing execution sequence.

In this embodiment, a lightweight TEE is constructed by using the permission management register, so that access to the root key stored in the eFuse is jointly managed by the permission management register and the interrupt status register. Only when the flag corresponding to the NMI in the interrupt status register and the flag corresponding to the NMI in permission management register are set, the system enters the TEE mode from the REE mode, and the CPU may obtain the root key in the TEE mode by using a system bus or a cache, and execute the secure storage service in the TEE mode. In addition, the eFuse can be programmed only once so that the root key cannot be tampered with, ensuring reliability of the working key.

Figure 8:
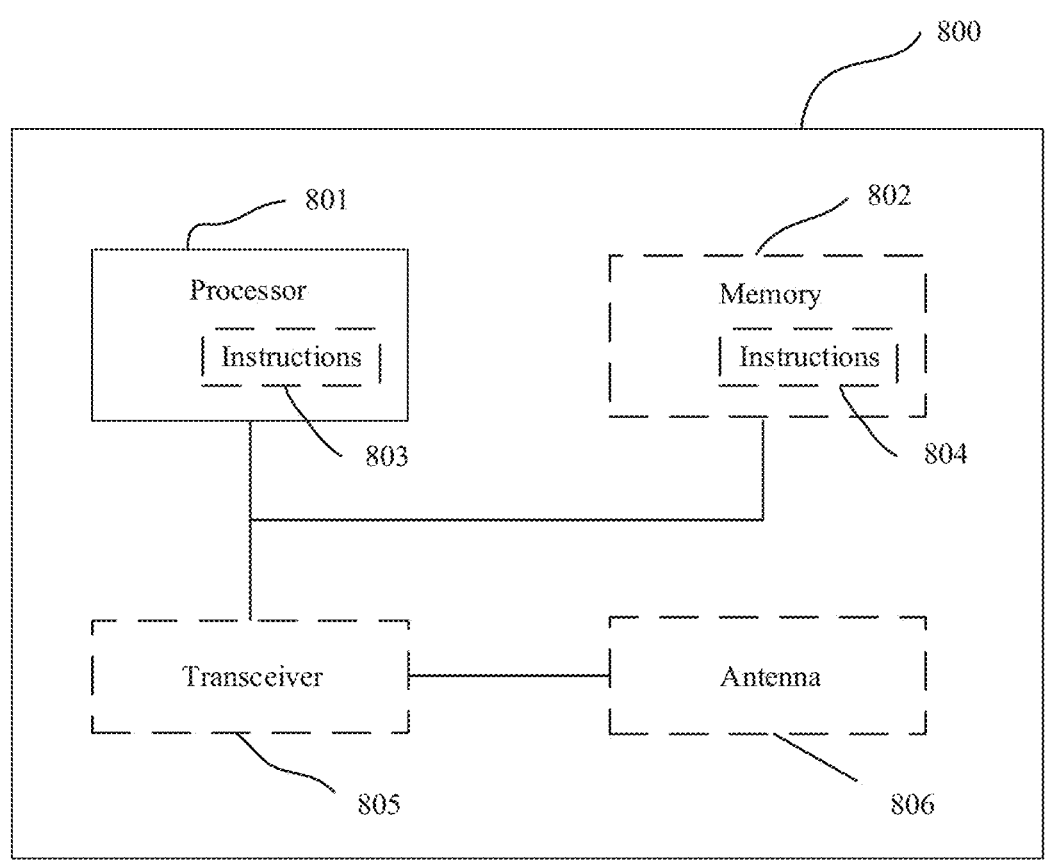
FIG. 8 is a schematic diagram of a structure of an electronic device according to an embodiment of this application.

FIG. 8 is a schematic diagram of a structure of an electronic device according to another embodiment of this application. As shown in FIG. 8, the electronic device 800 in this embodiment may be the terminal device (or a component that can be used in the terminal device) or the network device (or a component that can be used in the network device) mentioned in the foregoing method embodiments. The electronic device may be configured to implement the method performed by the computer system described in the foregoing method embodiments. For details, refer to the description in the foregoing method embodiments.

The electronic device 800 may include one or more processors 801. The processor 801 may also be referred to as a processing unit, and may implement a specific control or processing function. The processor 801 may be a general-purpose processor or a dedicated processor, for example, a baseband processor or a central processing unit. The baseband processor may be configured to process a communication protocol and communication data. The central processing unit may be configured to: control an electronic device, execute a software program, and process data of the software program.

In an optional design, the processor 801 may also store instructions 803 or data (for example, intermediate data). The instructions 803 may be run by the processor, so that the electronic device performs the method that corresponds to the terminal device or the network device and that is described in the foregoing method embodiments.

In still another possible design, the electronic device may include a circuit. The circuit may implement a sending function, a receiving function, or a communication function in the foregoing method embodiments.

Optionally, the electronic device may include one or more memories 802, and the memory 802 may store instructions 804. The instructions may be run on the processor, so that the electronic device performs the method described in the foregoing method embodiments.

Optionally, the memory may also store data. The processor and the memory may be separately disposed, or may be integrated together.

Optionally, the electronic device 800 may further include a transceiver 805 and/or an antenna 806. The processor 801 may be referred to as a processing unit, and controls the electronic device (a terminal device or a network device). The transceiver 805 may be referred to as a transceiver unit, a transceiver, a transceiver circuit, a transceiver, or the like, and is configured to implement a transceiver function of the electronic device.

In a design, it is assumed that the electronic device 800 is configured to implement operations of the computer system in the foregoing embodiments. For example, the processor 801 may invoke a target service, and set a first interrupt flag and a first call flag based on a first interrupt triggered by the target service. The first interrupt flag and the first call flag indicate whether access to target storage space is allowed. If determining to allow the access to the target storage space based on the first interrupt flag and the first call flag, the processor 801 may obtain first information in the target storage space in a TEE mode, and execute the target service based on the first information.

For a specific implementation process of the processor 801, refer to related descriptions in the foregoing embodiments. Details are not described herein again.

The processor 801 and the transceiver 805 described in this application may be implemented on an integrated circuit (integrated circuit, IC), an analog IC, a radio frequency integrated circuit (radio frequency integrated circuit, RFIC), a mixed signal IC, an application-specific integrated circuit (application specific integrated circuit, ASIC), a printed circuit board (printed circuit board, PCB), an electronic device, or the like. The processor and the transceiver may also be manufactured by using various IC technologies, for example, a complementary metal oxide semiconductor (complementary metal oxide semiconductor, CMOS), an N-type metal oxide semiconductor (nMetal-oxide-semiconductor, NMOS), a positive channel metal oxide semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

Although in the descriptions of the foregoing embodiment, the electronic device is described by using the terminal device or the network device as an example, the electronic device described in this application is not limited to the terminal device or the network device, and a structure of the electronic device may not be limited by FIG. 8. The electronic device may be an independent device, or a part of a large device. For example, the device may be:

(1) an independent integrated circuit IC, a chip, or a chip system or subsystem;

(2) a set with one or more ICs, where optionally, the IC set may also include a storage component configured to store data and/or instructions;

(3) an ASIC, for example, a modem (MSM);

(4) a module that can be embedded in another device;

(5) a receiver, a wireless device, a mobile unit, a network device, and the like; or (6) another device, or the like.

Figure 9:
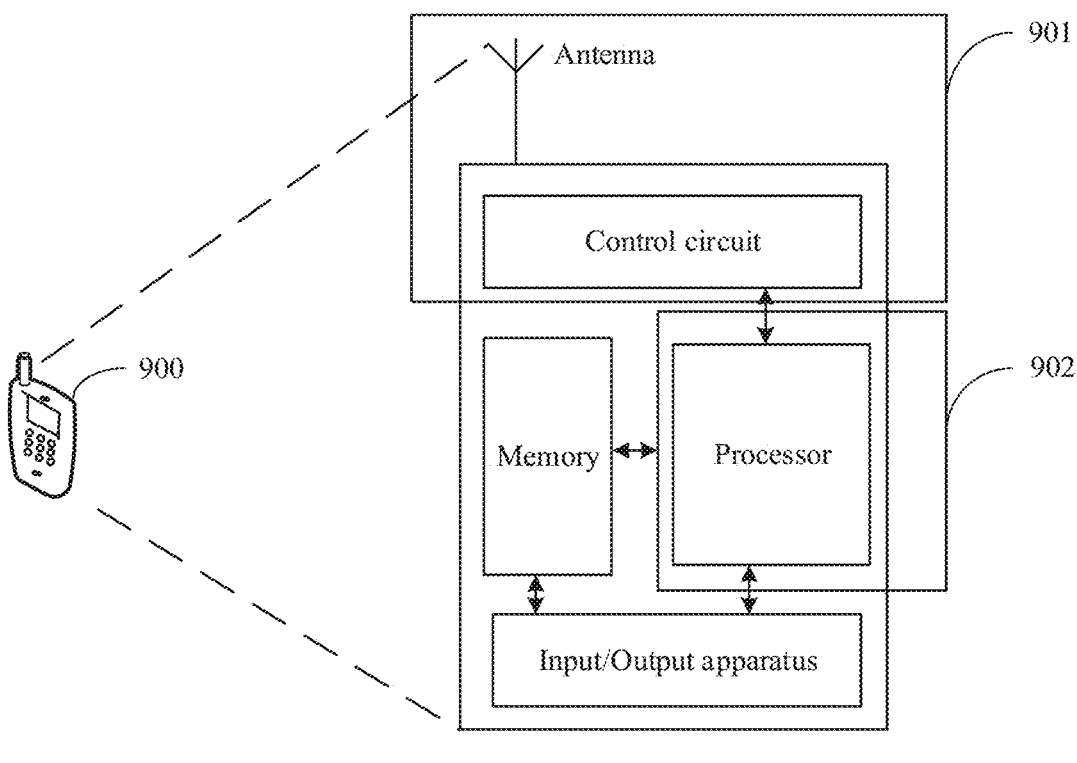
FIG. 9 is a schematic diagram of a structure of an electronic device according to another embodiment of this application.

FIG. 9 is a schematic diagram of a structure of an electronic device according to another embodiment of this application. The terminal device may include the computer system in the foregoing embodiments of this application. For ease of description, FIG. 9 only shows main components of the terminal device. As shown in FIG. 9, the terminal device 900 includes a processor, a memory, a control circuit, an antenna, and an input/output apparatus. The processor is mainly configured to: process a communication protocol and communication data, control the entire terminal device, execute a software program, and process data of the software program. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to receive data entered by a user, and output data to the user.

After the terminal device is powered on, the processor may read a software program in a memory cell, explain and execute instructions of the software program, and process data of the software program. When data needs to be sent wirelessly, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. Actually, the terminal may have a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 9 integrates functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in a memory cell in a form of the software program. The processor executes the software program to implement a baseband processing function.

In an example, the antenna having a transceiver function and the control circuit may be considered as a transceiver module 901 of the terminal device 900, and the processor having a processing function may be considered as a processing module 902 of the terminal device 900. As shown in FIG. 9, the terminal device 900 includes the transceiver module 901 and the processing module 902. The transceiver module 901 may also be referred to as a transceiver, a transceiver machine, a transceiver apparatus, or the like. Optionally, a part that is configured to implement a receiving function and in the transceiver module 901 may be considered as a receiving module, and a part that is configured to implement a sending function and in the transceiver module 901 may be considered as a sending module. In other words, the transceiver module 901 includes the receiving module and the sending module. The receiving module may also be referred to as a receiver, a receiver circuit, or the like. The sending module may be referred to as a transmitter, a transmitter circuit, or the like.

It should be noted that, in this embodiment of this application, module division is an example, and is merely a logical function division. In actual implementation, another division manner may be used. Function modules in embodiments of this application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded or executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

What is claimed is:

1. A computer system, comprising an interrupt status register, a permission management register, a processor, a target storage space, and a memory storing programming instructions for execution by the processor to:

set, based on a first interrupt triggered by a target service, (1) a flag corresponding to the first interrupt in the interrupt status register to a first interrupt flag and (2) a flag corresponding to the first interrupt in the permission management register to a first call flag, wherein the first interrupt flag and the first call flag indicate whether access to the target storage space is allowed;

in response to determining that both the first interrupt flag and the first call flag indicate access to the target storage space is allowed, allow the processor to access the target storage space;

obtain first information in the target storage space in a TEE mode if determining that the processor is allowed to access the target storage space, wherein the TEE mode is a separate and isolated execution environment from a rich execution environment (REE), and wherein the processor is configured to enter the TEE mode from the REE only when both the first interrupt flag and the first call flag indicate that access to the target storage space is allowed; and execute the target service based on the first information.

2. The system according to claim 1, wherein the first interrupt is a non-maskable interrupt (NMI).

3. The system according to claim 1, wherein the programming instructions are for execution by the processor to set the first call flag based on a first interrupt priority.

4. The system according to claim 3, wherein the programming instructions are for execution by the processor to:

determine whether the first interrupt is an interrupt with a currently highest priority; and if the processor determines that the first interrupt is the interrupt with the currently highest priority, set the first call flag; or if the processor determines that the first interrupt is not the interrupt with the currently highest priority, set the first call flag after executing an interrupt with a higher priority than the first interrupt.

5. The system according to claim 1, wherein the system further comprises a memory protection unit configured to set a second call flag of the target storage space, wherein the first interrupt flag, the first call flag, and the second call flag indicate whether the processor is allowed to access the target storage space, and wherein the programming instructions are for execution by the processor to determine, based on the first interrupt flag, the first call flag, and the second call flag, whether to allow the access to the target storage space.

6. The system according to claim 5, wherein:

if the second call flag indicates that the processor is not allowed to access the target storage space, the processor is not allowed to access the target storage space;

if the second call flag indicates that the processor is allowed to access the target storage space, and the first interrupt flag or the first call flag indicate that the processor is not allowed to access the target storage space, the processor is not allowed to access the target storage space; or if the second call flag indicates that the processor is allowed to access the target storage space, and the first interrupt flag and the first call flag both indicate that the processor is allowed to access the target storage space, the processor is allowed to access the target storage space.

7. The system according to claim 1, wherein the programming instructions are for execution by the processor to reset the flag corresponding to the first interrupt in the interrupt status register.

8. The system according to claim 1, wherein the programming instructions are for execution by the processor to clear and release a resource invoked by the target service based on the first interrupt.

9. The system according to claim 1, wherein the target storage space comprises one or a plurality of memory cells in a non-volatile memory or a volatile memory.

10. The system according to claim 9, wherein the plurality of memory cells are a plurality of consecutive memory cells or a plurality of inconsecutive memory cells.

11. A service processing method performed by a computer system, wherein the method comprises:

in response to a target service being invoked, setting a first interrupt flag and a first call flag based on a first interrupt triggered by the target service, wherein the first interrupt flag and the first call flag indicate whether access to a target storage space in the computer system is allowed;

in response to determining that both the first interrupt flag and the first call flag indicate access to the target storage space is allowed, obtaining first information in the target storage space in a trusted execution environment (TEE) mode and allow a processor of the computer system to access the target storage space, wherein the TEE mode is a separate and isolated execution environment from a rich execution environment (REE), and wherein the processor is configured to enter the TEE mode from the REE only when both the first interrupt flag and the first call flag indicate that access to the target storage space is allowed; and executing the target service based on the first information.

12. The method according to claim 11, wherein the first interrupt is a non-maskable interrupt (NMI).

13. The method according to claim 11, wherein setting the first call flag comprises:

setting the first call flag based on a first interrupt priority.

14. The method according to claim 13, wherein setting the first call flag comprises:

when the first interrupt is an interrupt with a currently highest priority, setting the first call flag; or when the first interrupt is not the interrupt with the currently highest priority, setting the first call flag after executing an interrupt with a higher priority than that of the first interrupt.

15. The method according to claim 11, wherein the method further comprises:

obtaining a second call flag, wherein the first interrupt flag, the first call flag, and the second call flag indicate whether the access to the target storage space is allowed.

16. The method according to claim 15, wherein: if the second call flag indicates that the access to the target storage space is not allowed, the access to the target storage space is not allowed;

if the second call flag indicates that the access to the target storage space is allowed, and the first interrupt flag or the first call flag indicate that the access to the target storage space is not allowed, the access to the target storage space is not allowed; or if the second call flag indicates that the access to the target storage space is allowed, and the first interrupt flag and the first call flag both indicate that the access to the target storage space is allowed, the access to the target storage space is allowed.

17. The method according to claim 11, wherein the method further comprises:

resetting a flag corresponding to the first interrupt.

18. The method according to claim 11, wherein the method further comprises:

clearing and releasing a resource invoked by the target service based on the first interrupt.

19. The method according to claim 11, wherein the target storage space comprises one or a plurality of memory cells in a non-volatile memory or a volatile memory.

20. The method according to claim 19, wherein the plurality of memory cells are a plurality of consecutive memory cells or a plurality of inconsecutive memory cells.

21. A chip configured to execute instructions to perform operations comprising:

in response to a target service being invoked, setting a first interrupt flag and a first call flag based on a first interrupt triggered by the target service, wherein the first interrupt flag and the first call flag indicate whether access to a target storage space is allowed;

in response to determining that both the first interrupt flag and the first call flag indicate access to the target storage space is allowed, obtaining first information in the target storage space in a trusted execution environment (TEE) mode, and allow the chip to access the target storage space, wherein the TEE mode is a separate and isolated execution environment from a rich execution environment (REE), and wherein the chip is configured to enter the TEE mode from the REE only when both the first interrupt flag and the first call flag indicate that access to the target storage space is allowed; and executing the target service based on the first information.

* * * * *